United States Patent
Feng et al.

(10) Patent No.: US 11,455,733 B2
(45) Date of Patent: Sep. 27, 2022

(54) SYSTEM AND METHOD TO IMPROVE MODEL-BASED ORGAN SEGMENTATION WITH IMAGE POST-PROCESSING

(71) Applicants: Xue Feng, Lexington, KY (US); Quan Chen, Lexington, KY (US)

(72) Inventors: Xue Feng, Lexington, KY (US); Quan Chen, Lexington, KY (US)

( * ) Notice: Subject to any disclaimer, the term of this patent is extended or adjusted under 35 U.S.C. 154(b) by 0 days.

(21) Appl. No.: 16/903,299

(22) Filed: Jun. 16, 2020

(65) Prior Publication Data
US 2021/0390709 A1 Dec. 16, 2021

(51) Int. Cl.
*G06T 7/174* (2017.01)
*G06T 7/11* (2017.01)
*G06T 5/00* (2006.01)

(52) U.S. Cl.
CPC .............. *G06T 7/174* (2017.01); *G06T 5/005* (2013.01); *G06T 7/11* (2017.01); *G06T 2207/10012* (2013.01); *G06T 2207/10072* (2013.01)

(58) Field of Classification Search
CPC . G06T 2207/10072; G06T 2207/10012; G06T 5/005; G06T 7/11; G06T 7/174
See application file for complete search history.

(56) References Cited

U.S. PATENT DOCUMENTS

| | | | |
|---|---|---|---|
| 9,672,617 B2 * | 6/2017 | Dean | A61F 2/2875 |
| 9,785,858 B2 * | 10/2017 | Seifert | G06T 7/11 |
| 9,836,848 B2 * | 12/2017 | Markov | G16H 30/20 |
| 10,083,515 B2 * | 9/2018 | Ostrovsky-Berman | G06T 7/187 |
| 10,127,654 B2 * | 11/2018 | Murphy | A61B 8/5215 |
| 10,339,648 B2 * | 7/2019 | Stringfield | G06T 7/0012 |
| 10,453,199 B2 * | 10/2019 | Weistrand | G06T 7/149 |
| 10,964,027 B2 * | 3/2021 | Weistrand | G06T 7/12 |
| 11,030,747 B1 * | 6/2021 | Feng | G06N 3/08 |
| 11,210,494 B2 * | 12/2021 | Chan | G06V 10/454 |

(Continued)

FOREIGN PATENT DOCUMENTS

| | | | | |
|---|---|---|---|---|
| CN | 107997778 B | * | 9/2021 | A61B 6/03 |
| CN | 114187211 A | * | 3/2022 | |

OTHER PUBLICATIONS

Nazari, M. "Automated and robust organ segmentation for 3D-based internal dose calculation" EJNMMI Research (Jun. 7, 2021) pp. 1-13.*

(Continued)

*Primary Examiner* — Mia M Thomas (57) ABSTRACT

The present disclosure relates to a method and apparatus to improve model-based organ segmentation with image post-processing using one or more processors. The method includes: receiving three-dimensional (3D) CT or MR images and the corresponding voxel-by-voxel segmentation results from the output of an automatic DCNN segmentation model, analyzing the segmentation results on a 3D basis according to organ anatomical information, processing the results to identify regions with anatomically incorrect segmentations, fixing the incorrect segmentations, analyzing the remaining segmentation results on a two-dimensional (2D) and slice-by-slice basis according to predefined organ segmentation criteria, identifying the start and end slices, processing the results to remove segmentations beyond the identified slices to obtain the final results.

7 Claims, 6 Drawing Sheets

(56) References Cited

U.S. PATENT DOCUMENTS

| | | | | |
|---|---|---|---|---|
| 11,216,950 | B2* | 1/2022 | Cho | G06T 7/187 |
| 2009/0226060 | A1* | 9/2009 | Gering | G06T 7/174 |
| | | | | 382/128 |
| 2012/0230566 | A1* | 9/2012 | Dean | A61F 2/30942 |
| | | | | 382/128 |
| 2012/0257805 | A1* | 10/2012 | Gloger | G06T 7/11 |
| | | | | 382/128 |
| 2015/0356730 | A1* | 12/2015 | Grove | G06T 7/64 |
| | | | | 382/124 |
| 2016/0048987 | A1* | 2/2016 | Sevenster | G06T 7/38 |
| | | | | 715/232 |
| 2017/0148156 | A1* | 5/2017 | Bregman-Amitai | |
| | | | | A61B 6/5217 |
| 2018/0165808 | A1* | 6/2018 | Bagci | A61B 6/032 |
| 2018/0214111 | A1* | 8/2018 | Madabhushi | G06V 10/40 |
| 2019/0066343 | A1* | 2/2019 | Bogoni | A61B 6/5205 |
| 2019/0122365 | A1* | 4/2019 | Farhangi | G06T 7/11 |
| 2019/0259159 | A1* | 8/2019 | Udupa | A61B 5/7275 |
| 2020/0380688 | A1* | 12/2020 | Abramoff | G06N 3/0445 |
| 2021/0142471 | A1* | 5/2021 | Tran | G16H 30/40 |

OTHER PUBLICATIONS

Wimmer et al. "Two-stage Semi-automatic Organ Segmentation Framework using Radial Basis Functions and Level Sets" ResearchGate: 3D Segmentation in the Clinic (Apr. 2007) pp. 1-11.*

* cited by examiner

SYSTEM AND METHOD TO IMPROVE MODEL-BASED ORGAN SEGMENTATION WITH IMAGE POST-PROCESSING

STATEMENT OF GOVERNMENT INTEREST

This invention was made with government support under Grant No. R43EB027523-01A1 awarded by The National Institute of Health. The government has certain rights in the invention.

CROSS-REFERENCE TO RELATED APPLICATION

Not applicable.

FIELD

This disclosure relates to medical image operations that develop and validate a post-processing method to improve upon model-based organ segmentation.

BACKGROUND

Automatic segmentation of organs by delineating the boundaries from medical images is a key step in radiation treatment planning for cancer patients as it can reduce human efforts and bias. Segmentation methods based on computational models, such as the deep convolutional neural network (DCNN), have shown great success in this task. However, in such models, as the segmentation is often done voxel-by-voxel, the results can be suboptimal as the DCNN is unable to take explicit anatomical information into account. Furthermore, in clinical practice, the segmentation often follows certain human-defined criteria. For example, when segmenting heart from tomographic images such as CT, it is required to identify one slice as the cut-off slice beyond which no heart should be segmented, even though the true anatomy extends beyond this slice. The proposed method aims to improve the segmentation results by using image post-processing to identify and fix these errors.

SUMMARY

Examples of the present disclosure provide a method to improve model-based automatic segmentation of organs from CT or MR images in radiation treatment planning using image post-processing algorithms.

According to a first aspect of the present disclosure, a computer-implemented method for image post-processing to improve model-based organ segmentation. The method may include receiving three-dimensional (3D) CT or MR images and the corresponding voxel-by-voxel segmentation results from the output of an automatic DCNN segmentation model, analyzing the segmentation results on a 3D basis according to organ anatomical information, processing the results to identify regions with anatomically incorrect segmentations, fixing the incorrect segmentations, analyzing the remaining segmentation results on a two-dimensional (2D) and slice-by-slice basis according to predefined organ segmentation criteria, identifying the start and end slices, processing the results to remove segmentations beyond the identified slices to obtain the final results.

According to a second aspect of the present disclosure, an apparatus for image post-processing to improve model-based organ segmentation. The apparatus may include one or more processors, a display, and a non-transitory computer-readable memory storing instructions executable by the one or more processors. Wherein the instructions are configured to receive three-dimensional (3D) CT or MR images and the corresponding voxel-by-voxel segmentation results from the output of an automatic DCNN segmentation model, analyze the segmentation results on a 3D basis according to organ anatomical information, process the results to identify regions with anatomically incorrect segmentations, fix the incorrect segmentations, analyze the remaining segmentation results on a two-dimensional (2D) and slice-by-slice basis according to predefined organ segmentation criteria, identify the start and end slices, process the results to remove segmentations beyond the identified slices to obtain the final results.

According to a third aspect of an example of the present disclosure, a non-transitory computer-readable storage medium having stored therein instructions is provided. When the instructions are executed by one or more processors or one or more graphic processing units of the apparatus, the instructions cause the apparatus to receive three-dimensional (3D) CT or MR images and the corresponding voxel-by-voxel segmentation results from the output of an automatic DCNN segmentation model, analyze the segmentation results on a 3D basis according to organ anatomical information, process the results to identify regions with anatomically incorrect segmentations, fix the incorrect segmentations, analyze the remaining segmentation results on a two-dimensional (2D) and slice-by-slice basis according to predefined organ segmentation criteria, identify the start and end slices, process the results to remove segmentations beyond the identified slices to obtain the final results.

Other aspects and features according to the example embodiments of the disclosed technology will become apparent to those of ordinary skill in the art, upon reviewing the following detailed description in conjunction with the accompanying figures.

BRIEF DESCRIPTION OF THE DRAWINGS

Reference will now be made to the accompanying drawings, which are not necessarily drawn to scale.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

The present disclosure related to an image post-processing framework to improve model-based organ segmentation from CT or MRI.

Figure 1:
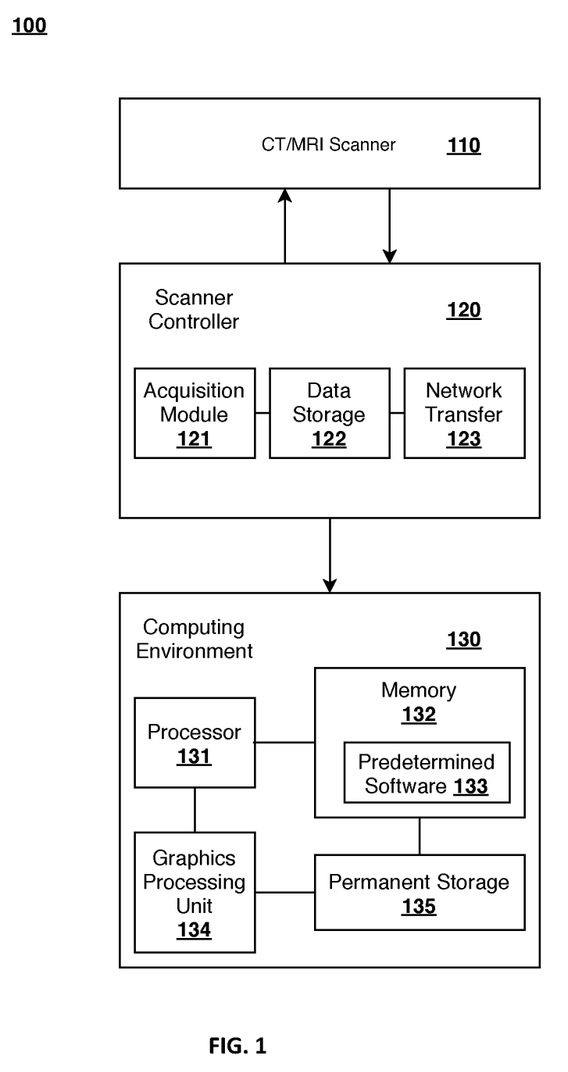
FIG. 1 is a system diagram of CT/MRI scanner, controller and computing environment illustrating an operating environment capable of implementing aspects of the present disclosure.

FIG. 1 shows a system diagram of CT/MRI scanner 110, controller 120 and computing environment 130. The CT/MRI scanner 110 is used to obtain CT/MRI images covering the body region of a subject and is controlled by the scanner controller 120. The scanner controller 120 contains the acquisition module 121 that drives the CT/MRI scanner 110, the data storage module 122 that stores the CT/MRI images of different subjects, and the network transfer module 123 that sends the CT/MRI images to other computing environment 130. The computing environment 130 contains processor 131, graphics processing unit 134, memory 132 and permanent storage 135 to perform given directions. In executing the directions, the predetermined software 133 is loaded into memory 132 and executed by processor 131 to yield the desired output.

The processing component 120 typically controls overall operations of the computing environment 130, such as the operations associated with display, data acquisition, data communications, and image processing. The processor 131 may include one or more processors to execute instructions to perform all or some of the steps in the above described methods. Moreover, the processor 131 may include one or more modules which facilitate the interaction between the processor 131 and other components. The processor may be a Central Processing Unit (CPU), a microprocessor, a single chip machine, a GPU, or the like. GPU 134 can include one or more GPUs interconnected to execute one or more GPU executable programs.

The memory 132 is configured to store various types of data to support the operation of the computing environment 130. Examples of such data comprise instructions for any applications or methods operated on the computing environment 130, CT datasets, image data, etc. The memory 132 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

In an embodiment, the computing environment 130 may be implemented with one or more application specific integrated circuits (ASICs), digital signal processors (DSPs), digital signal processing devices (DSPDs), programmable logic devices (PLDs), field programmable gate arrays (FPGAs), graphical processing units (GPUs), controllers, micro-controllers, microprocessors, or other electronic components, for performing the above methods.

The image post-processing method to improve model-based organ segmentation is programmed as one set of predetermined software 133 and installed on the computing environment 130. When the computing environment 130 receives CT/MRI images from scanner controller 120, the predetermined software 133 is executed to generate the segmentation results.

Figure 2:
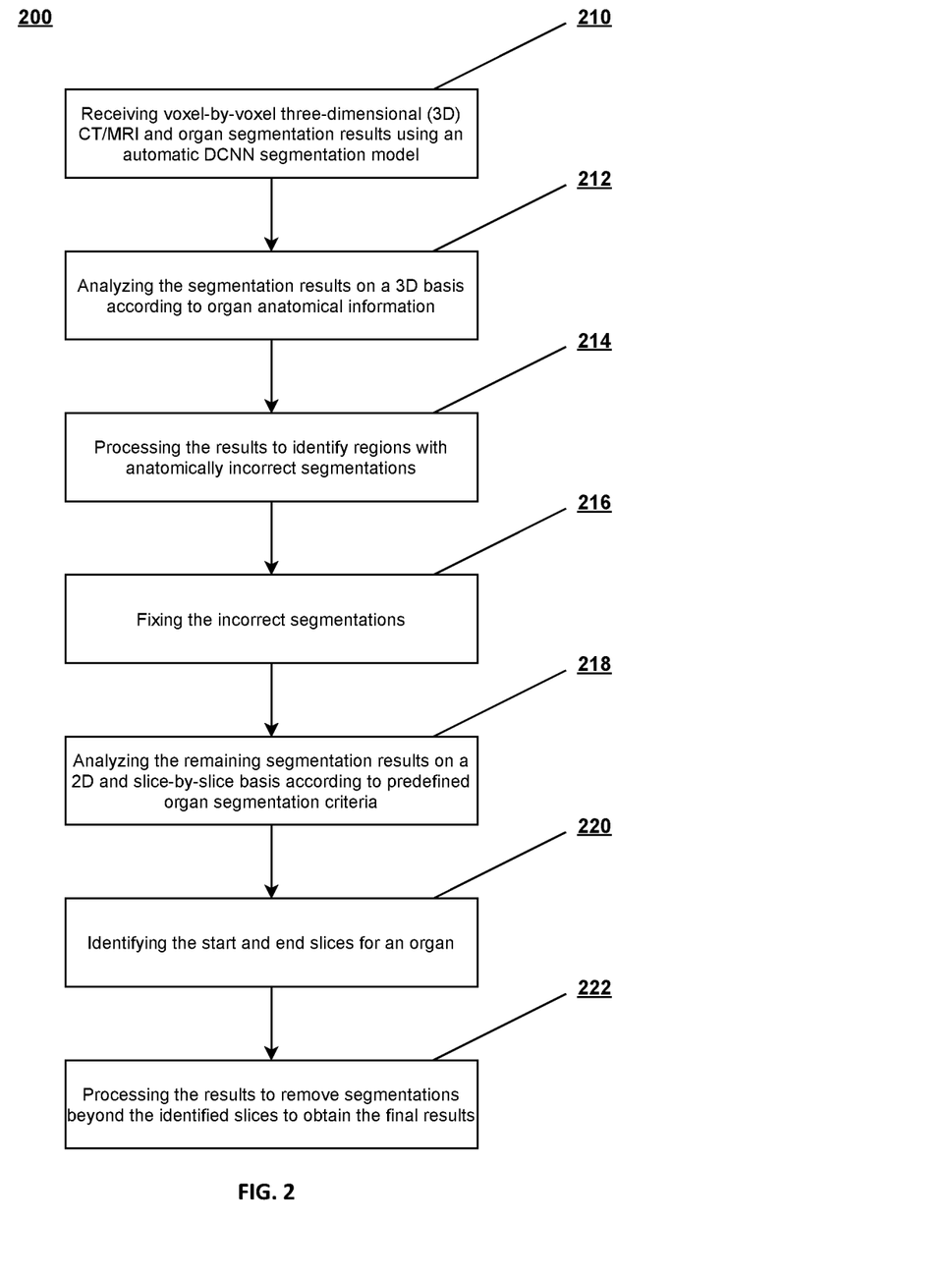
FIG. 2 is a flow chart illustrating a method to improve model-based organ segmentation with image post-processing, according to an example of the present disclosure.

FIG. 2 shows an example flow chart setting forth the steps of a method 200 in accordance with the present disclosure.

In step 210, three-dimensional (3D) CT/MRI images covering a specific body region and voxel-by-voxel segmentations from an automatic DCNN segmentation model containing the original segmentation labels of different organs are received. Due to the nature of DCNN model, in which each voxel is calculated independently without considering the organ anatomical information and commonly adopted criteria, the DCNN output may contain suboptimal segmentations including incorrect anatomy and lack of clear distinction of start and end slices.

Figure 3:
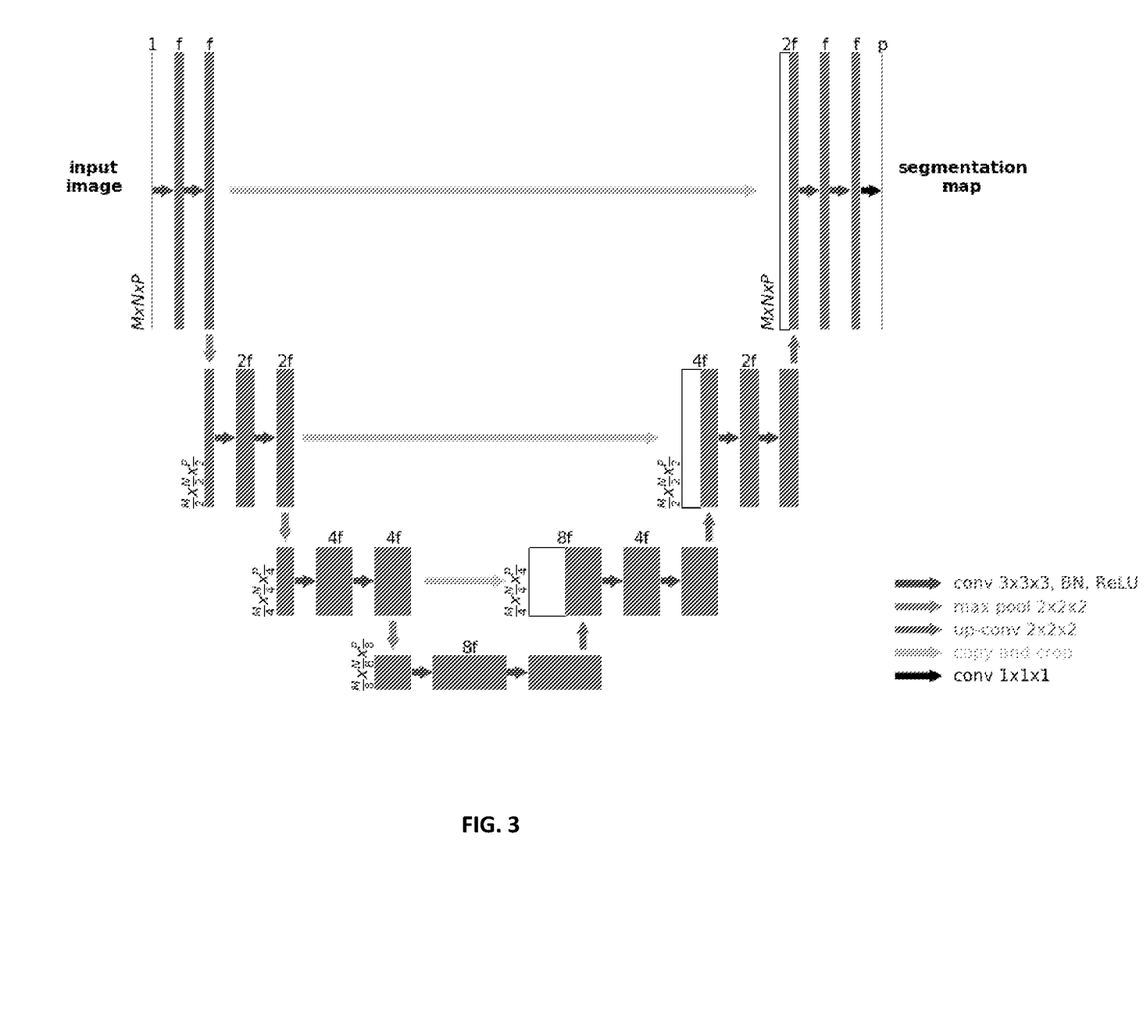
FIG. 3 is a convolutional neural network structure used in the segmentation model, according to an example of the present disclosure.

FIG. 3 shows one example of the deep convolutional neural network (DCNN). The specific network structure is denoted as 3D U-Net. Each encoding block consists of two sets of consecutive convolutions, batch norm and rectifier linear activation layers. Padding was used to maintain the spatial dimension during convolution. Number of features were doubled after each pooling layer. Long range connections were used by concatenating the outputs from the corresponding encoding blocks with the decoding blocks. M, N, P, f and p are parameters that are unique for each network. The output of the network is an voxel-by-voxel segmentation map in which each voxel is assigned as one class (background or one of the targeting organs).

Figure 4:
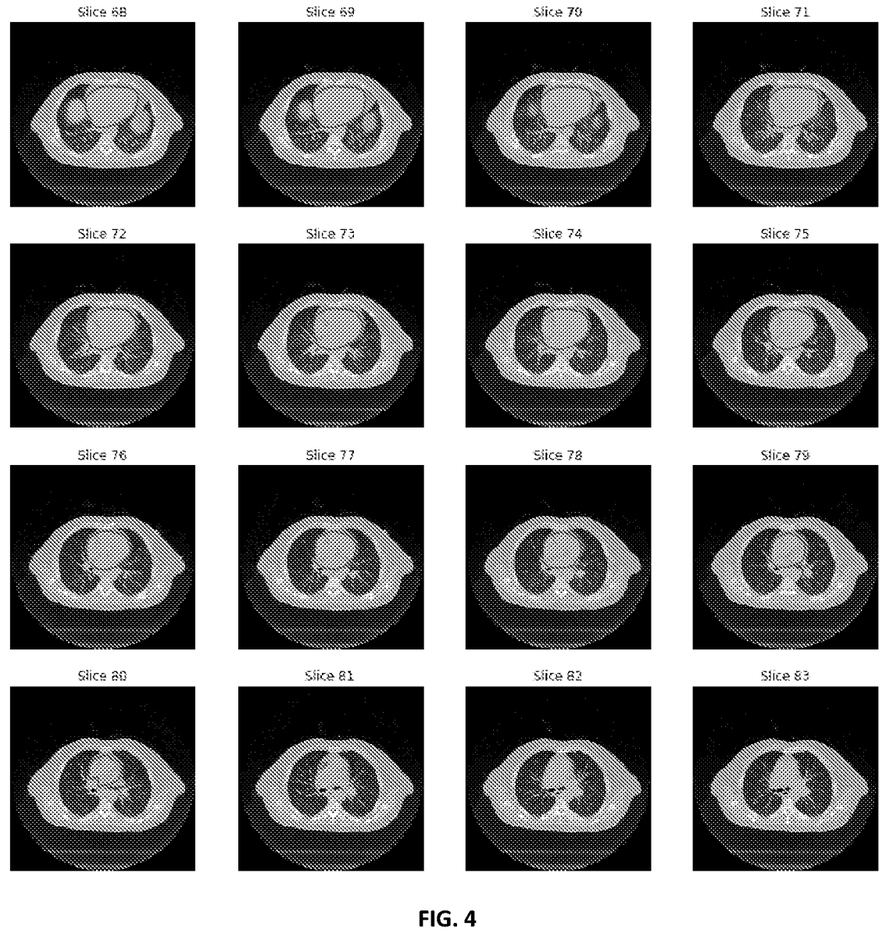
FIG. 4 is the output segmentation from a segmentation model with Slice 68-83 denoting the axial slices, according to an example of the present disclosure.

FIG. 4 shows the direct segmentation results for one organ (heart) generated by the DCNN model. Due to the large number of axial slices, only slice 68 to 83 are shown. The contour on top of the image delineates the boundary of the organ on each slice, in which the voxels inside the contour are classified as belong to this organ.

Anatomically, most body organs, such as the heart, conform to a specific shape and have rather smooth boundaries. Furthermore, in clinical practice, the segmentation needs to follow certain guidance even if the actual boundary of the organ is ambiguous. Therefore, the final 3D voxel maps of one organ should abide by the following rules: 1) the 3D voxel maps are one spatially connected region; 2) on each axial slice, the contours need to be convex and do not have any holes inside; and 3) for certain organs, such as the heart, there should be a distinctive "cut-off" slice on the superior end to follow the guideline. However, as the computation model provides voxel-to-voxel segmentations, these rules are not necessarily followed. We propose to use image post-processing to identify whether these rules are followed and fix the direct DCNN output to yield improved organ segmentations.

The following criteria is used to define connectivity: two pixels/voxels are connected when they are neighbors and have the same value. In 2D, they can be neighbors either in a 1- or 2-connected sense. The value refers to the maximum number of orthogonal hops to consider a pixel/voxel a neighbor. In 3D, 4-connectivity means connected pixels/voxels have to share face, whereas with 8-connectivity, they have to share only edge or vertex.

In step 212, the 3D connective analysis is performed on the voxel-by-voxel segmentation results using different rules for different organs based on the anatomical information. For example, normal humans have one heart and one esophagus but have two kidneys (left and right) and two lungs (left and right), which are at similar sizes. All voxels within the organ are labeled as 1 and voxels outside the organ are labeled as 0.8-connectivity is used to find connected regions.

In step 214, the volume of each region is calculated by adding the voxels of each connected region.

In step 216, the relationships among volumes of different regions are calculated. For single organ, only the region whose volume is the maximum is retained. For dual organ, if the number of the regions is greater than two, the regions whose volumes are smaller than the two maximum ones are removed. All other regions are relabeled as 0.

In step 218, the remaining segmentation results are analyzed on a 2D and slice-by-slice basis along the axial direction. First, the holes within the slice are identified and filled via morphological closing; then, the boundaries are processed via convex hull operation; finally, the 2D connective analysis is performed. 2-connectivity is used to find connected regions. The resulting area of the organ on each slice is then calculated.

The morphological closing on an image is defined as a dilation followed by an erosion. Closing can remove small dark spots (i.e. "pepper") and connect small bright cracks. This tends to "close" up (dark) gaps between (bright) features.

The convex hull is the set of pixels included in the smallest convex polygon that surround all white pixels in the input image.

Figure 5A:
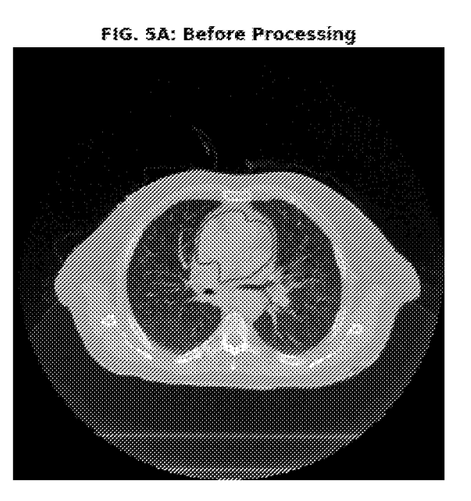
FIG. 5A is the output segmentation from one axial slice before post-processing, according to an example of the present disclosure.
Figure 5B:
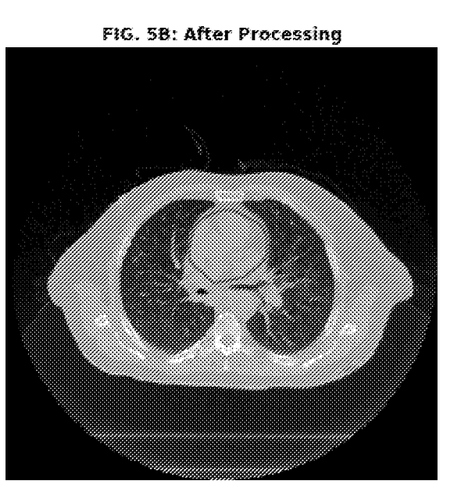
FIG. 5B is the output segmentation from one axial slice after post-processing, according to an example of the present disclosure.

FIG. 5 shows one slice of the image and the contour before processing (FIG. 5A) and after processing in step 218 (FIG. 5B).

In step 220, the axial slices are stacked together and arranged from one direction to another (e.g. from head to foot). To identify the cut-off bottom and top slices based on the organ segmentation criteria, for each slice, if the area is smaller than ½ of the next consecutive slice, the next slice is regarded as the "cut-off" slice, or the edge slice whose contours are retained. The segmentations on all slices beyond these slices are removed.

In step 222, the incorrect segmentations are removed by assigning the voxels to 0.

As shown in FIG. 4, the area of slice 81 is smaller than ½ of the area of slice 80; therefore, slice 80 is regarded as the "cut-off" slice and the segmentations on all slices beyond 80 are removed, leading to a clean cut-off in heart segmentation. From the bottom, no slices have an area that is smaller than ½ of the neighboring slices; therefore, the bottom slice is chosen as the original slice that has segmentations, in this case, slice 68.

Figure 6:
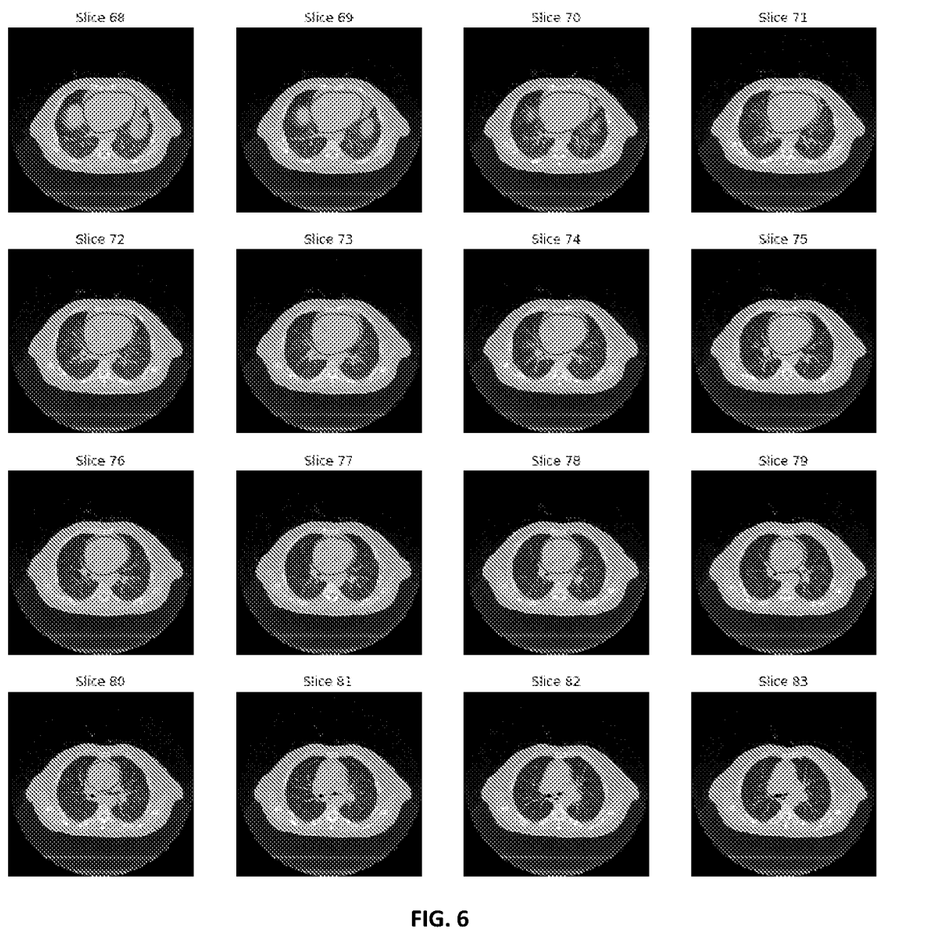
FIG. 6 is the final segmentation after the image post-processing with Slice 68-83 denoting the axial slices, according to an example of the present disclosure.

FIG. 6 shows the final segmentation with anatomically incorrect segmentations and removed through the image post-processing method.

What is claimed is:

1. A computer-implemented method to improve model-based organ segmentation with image post-processing using one or more processors, comprising:
    receiving three-dimensional (3D) CT or MR images and the corresponding voxel-by-voxel segmentation results as from the output of an automatic DCNN segmentation model;
    analyzing the segmentation results on a 3D basis according to organ anatomical information;
    processing the results to identify regions with anatomically incorrect segmentations;
    fixing the incorrect segmentations;
    analyzing the remaining segmentation results on a two-dimensional (2D) and slice-by-slice basis according to predefined organ segmentation criteria;
    identifying the start and end slices; and
    processing the results to remove segmentations beyond the identified slices to obtain the final results.

2. The computer-implemented method to improve model-based organ segmentation with image post-processing according to claim 1, further comprising:
    performing 3D connective analysis to find 3D connected regions;
    calculating the volumes of each region; and
    removing segmentations for regions with volumes smaller than the largest one or two regions based on the specific anatomical information of the target organ.

3. The computer-implemented method to improve model-based organ segmentation with image post-processing according to claim 1, where analyzing the remaining segmentation results on a two-dimensional (2D) and slice-by-slice basis according to predefined organ segmentation criteria comprises:
    performing 2D connective analysis to find 2D connected regions;
    calculating the volumes of each axial slice;
    comparing volumes of neighboring slices; and
    identifying the edge slice based on a threshold of the ratios between neighboring slices.

4. An apparatus to improve model-based organ segmentation with image post-processing using one or more processors, comprising:
    one or more processors;
    a display; and
    a non-transitory computer readable memory storing instructions executable by the one
    or more processors, wherein the instructions are configured to:
    receive three-dimensional (3D) CT or MR images and the corresponding voxel-by-voxel segmentation results from the output of an automatic DCNN segmentation model;
    analyze the segmentation results on a 3D basis according to organ anatomical information;
    process the results to identify regions with anatomically incorrect segmentations;
    fix the incorrect segmentations;
    analyze the remaining segmentation results on a two-dimensional (2D) and slice-by-slice basis according to predefined organ segmentation criteria;
    identify the start and end slices;
    process the results to remove segmentations beyond the identified slices to obtain the final results.

5. The apparatus to improve model-based organ segmentation with image post-processing according to claim 4, further comprising:
- performing 3D connective analysis to find 3D connected regions;
- calculating the volumes of each region; and
- removing segmentations for regions with volumes smaller than the largest one or two regions based on the specific anatomical information of the target organ.

6. The apparatus to improve model-based organ segmentation with image post-processing according to claim 4, where analyzing the remaining segmentation results on a two-dimensional (2D) and slice-by-slice basis according to predefined organ segmentation criteria comprises:
- performing 2D connective analysis to find 2D connected regions;
- calculating the volumes of each axial slice;
- comparing volumes of neighboring slices; and
- identifying the edge slice based a threshold of the ratios between neighboring slices.

7. A non-transitory computer-readable storage medium having stored therein instructions that, when executed by one or more processors of an apparatus causing the apparatus to perform acts comprising:
- receiving three-dimensional (3D) CT or MR images and the corresponding voxel-by-voxel segmentation results as from the output of an automatic DCNN segmentation model;
- analyzing the segmentation results on a 3D basis according to organ anatomical information;
- processing the results to identify regions with anatomically incorrect segmentations;
- fixing the incorrect segmentations;
- analyzing the remaining segmentation results on a two-dimensional (2D) and slice-by-slice basis according to predefined organ segmentation criteria;
- processing the results to identify slices with anatomically incorrect segmentations;
- identifying the start and end slices;
- processing the results to remove segmentations beyond the identified slices to obtain the final results.

* * * * *